2,932,236

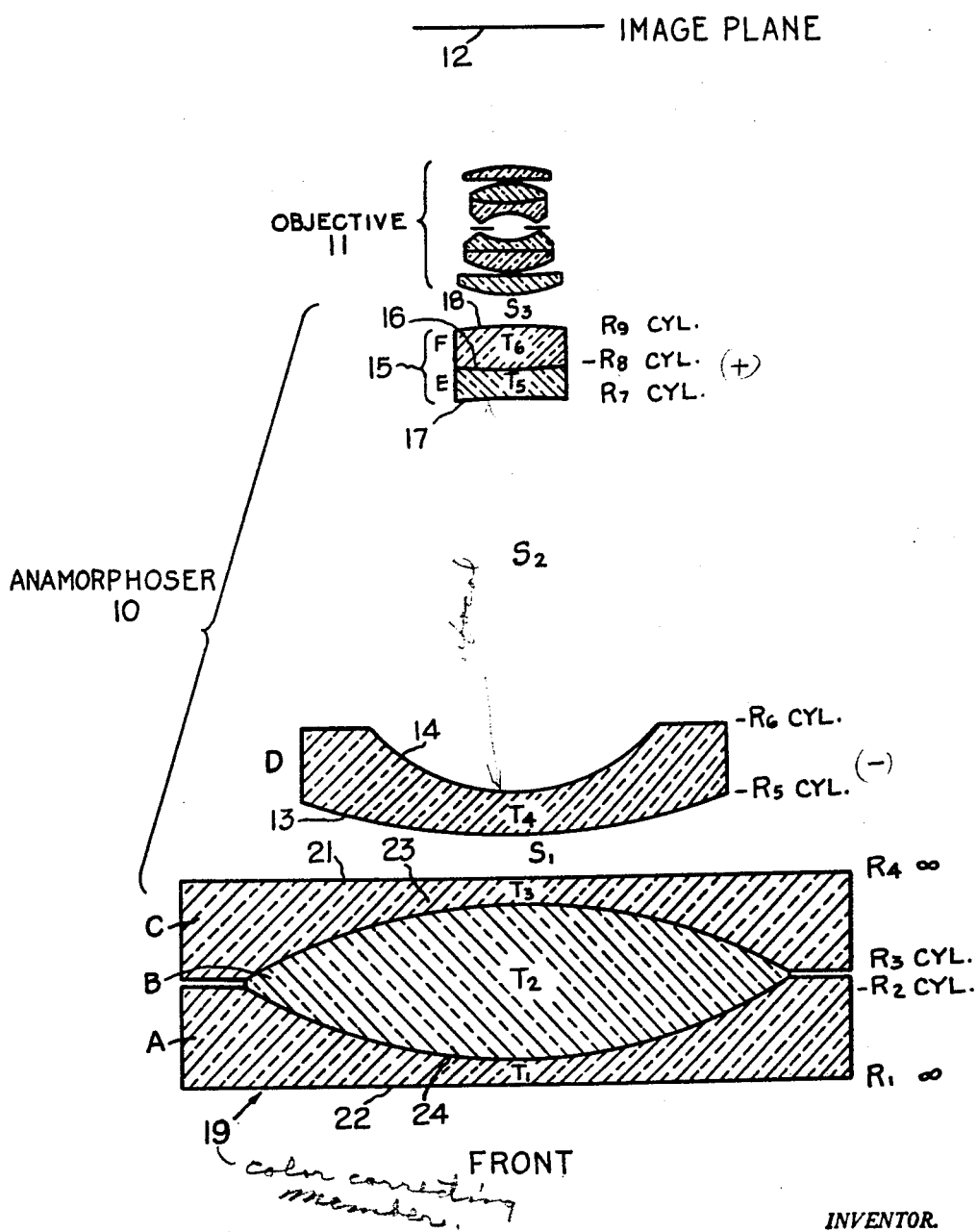
April 12, 1960     E. DELANO     2,932,236
ANAMORPHOSING LENS SYSTEM
Filed July 5, 1955
INVENTOR.
ERWIN DELANO

# United States Patent Office 2,932,236
Patented Apr. 12, 1960

ANAMORPHOSING LENS SYSTEM

Erwin Delano, Rochester, N.Y., assignor to Bausch & Lomb Optical Company, Rochester, N.Y., a corporation of New York Application July 5, 1955, Serial No. 519,739

2 Claims. (Cl. 88—57)

This invention relates to lenses and more particularly it has reference to means for correcting chromatic aberrations of images produced by the lenses.

In designing a lens system or a photographic or projection objective lens, for example, it is customary for the designer to make corrections for the various factors which affect the image including coma, distortion, curvature of field, spherical aberration, astigmatism and chromatic aberrations. Since many interdependent variables are involved, it is sometimes quite difficult to produce a lens system or objective lens which will embody satisfactory corrections for all of the aberrations. Difficulty is also frequently encountered in the manufacture of such lens systems and lenses because of the extreme care required in complying with small manufacturing tolerances which are necessary in order to produce a product in which all of the aberrations are corrected so that desired image quality may be attained.

In the various known forms of anamorphosing lens systems used in combination with cinematographic objective lenses to compress or expand the image in a horizontal direction, it has been found that the amount of horizontal distortion produced in the image by such systems is too great to permit their use in the latest types of cinematographic cameras and projectors. It has also been found that the aforementioned systems cannot be used in combination with cinematographic objectives having the shorter focal lengths and wider field angles. Much of the image distortion in wide angle lens systems is due to insufficient achromatization of the lenses but it is too costly and difficult to improve achromatization of known anamorphosing lens systems in the ordinary manner because of the unavailability of optical materials having the necessary color dispersion characteristics.

One of the objects of my invention is to provide novel means for correcting chromatic aberrations in a lens or lens system. A further object is to provide a lens system or lens in which the chromatic aberrations are corrected by a separate member which has substantially no effect on the other aberrations present. Another object is to provide efficient and improved means for correcting residual chromatic aberration in a lens or lens system. Still another object is to provide an improved anamorphosing cylindrical lens system for use with an objective so that the image formed by the objective may be expanded or compressed horizontally by said system with a minimum amount of distortion in the horizontal plane. A still further object is to provide such an anamorphosing cylindrical lens system which is particularly adapted for use with cinematographic objectives of relatively short focal lengths and wide field angles. A further object is to provide such an anamorphosing lens system in which the cylindrical lens members are so constructed and arranged as to produce substantial achromatism of the image when the system is used with an objective.

Further objects and advantages resides in certain novel features of construction, arrangement and combination of parts as will hereinafter be more fully described and pointed out in the appended claims.

The single figure of the drawing shows my invention embodied in an anamorphosing lens system.

In the drawing I have shown one form of my invention as embodied in a wide-angle anamorphosing lens system, generally designated 10, which is used in conjunction with a conventional camera objective 11 which is focused upon an image plane 12. Each anamorphosing system is designed for use with an objective 11 of a particular focal length and field angle as a matched set having the image aberrations and distortion corrected to substantially the same degree for both objective and anamorphoser.

The anamorphosing lens system is composed of two portions having distinctive functions which are: a magnification-changing portion which is characterized by color aberrations and a color correction portion which corrects the color aberrations in the image that is formed by these two portions and is transmitted by the objective 11. The magnification changing portion of the system compresses the incoming light rays in a horizontal direction and it comprises a cylindrical negative meniscus lens D having a front convex cylindrical surface 13 and a rear concave cylindrical surface 14. It further comprises a cylindrical positive meniscus lens 15 which is spaced rearwardly from the negative lens D and forwardly from the objective 11, with the concave sides of both cylindrical lenses facing each other. Both lenses 15 and D have their cylindrical axes located in a single vertical plane, which coincides with the optical axis of the anamorphosing system, and the lenses are separated from each other by the sum of their focal lengths so as to provide an afocal system.

In order to provide about a two times horizontal magnification of the image, the focal length of the lens D is made about twice that of the lens 15 and these lenses are jointly corrected for the monochromatic image aberrations of astigmatism, coma, spherical aberration and distortion in a horizontal plane. Part of the correction of the aforementioned aberrations is provided by making the rear lens 15 compound. Preferably, this lens comprises a rear double convex cylindrical element F which is cemented to a front double concave cylindrical element E along a negatively curved cylindrical interface 16, the outer front and rear surfaces 17 and 18, respectively, being positively curved cylindrical lens surfaces which are axially aligned as heretofore described. Element E is made of optical material having a refractive index greater than the refractive index of element F, and having a lesser Abbe number, here designated as $v$ value, than that of element F.

According to this invention, a compound color-correcting lens member 19 is provided as unitary means for reducing or substantially eliminating color aberrations from the image formed by the lens system. In its preferred form, lens member 19 comprises a plano-concave cylindrical front element A, a similar rear element C and a biconvex cylindrical element B which is cemented between the elements A and C. Elements C and A are provided with outer substantially parallel plano surfaces 21 and 22, respectively, and are joined to the double convex center element B along two cylindrical interfaces 23 and 24 which curve outwardly. The elements A, B and C are all constructed from optical materials having substantially the same refractive index so that light rays traversing the plano surfaced member 19 are substantially undeviated and the member 19 has zero refractive power.

In order to attain the quality of the color correction provided by the lens member 19, it is essential that the elements A and C be formed of optical materials having an Abbe number, designated by symbol $\nu$, of a value at least 10.0 greater than the $\nu$ value of the material of the center element B. It is further pointed out that the amount of color correction introduced into the image by the color-correcting member 19 is proportional to the difference between said $\nu$ values and is also dependent upon the amount of curvature on the interfaces 23 and 24, i.e., the steeper the curvature of the interfaces 23 and 24 and the greater the difference between said $\nu$ values, the greater the amount of color correction produced by member 19.

The axes of the cylindrical interfaces 23 and 24 are aligned in a single vertical plane which coincides with the optical axis of the lens system, similarly to the alignment of the cylindrical elements of lens 15. As far as the monochromatic aberrations of the lens system are concerned, the spacing between the D lens and the color-correcting member 19 may be varied through a wide range without ill effect but such spacing changes may only be made to adjust the character of the desired color correction.

Anamorphosing lens systems having the above-disclosed characteristics are constructed in several different focal lengths for cinematographic purposes and the constructional data is given herebelow for the 100 mm. focal length lens system in which: F is focal length of objective 11, $n_D$ is refractive index, $\nu$ is Abbe number, $R_1$ to $R_9$ are radii of cylindrical surfaces, $T_1$ to $T_6$ are axial thicknesses of elements A, B, C, D, E and F, $S_1$ to $S_3$ are the axial spacings between said elements, the notations proceeding in order from front to rear of the lens system.

[F=100.]

| Element | Radii | Thickness | Spacing | $n_D$ | $\nu$ |
|---|---|---|---|---|---|
| A | $R_1 = \infty$ | $T_1 = 7.5$ | 0 | 1.617 | 54.9 |
| | $R_2 = -136.77$ cyl. | | | | |
| B | $R_2 = -136.77$ cyl. | $T_2 = 24.0$ | 0 | 1.617 | 36.6 |
| | $R_3 = 136.77$ cyl. | | | | |
| C | $R_3 = 136.77$ cyl. | $T_3 = 7.5$ | $S_1 = 14.2$ | 1.617 | 54.9 |
| | $R_4 = \infty$ | | | | |
| D | $R_5 = -194.09$ cyl. | $T_4 = 12.3$ | $S_2 = 121.6$ | 1.617 | 54.9 |
| | $R_6 = -58.61$ cyl. | | | | |
| E | $R_7 = 251.19$ cyl. | $T_5 = 8.2$ | 0 | 1.617 | 36.6 |
| | $R_8 = -187.07$ cyl. | | | | |
| F | $R_8 = -187.07$ cyl. | $T_6 = 14.2$ | $S_3 = 3.8$ | 1.541 | 59.9 |
| | $R_9 = 87.9$ cyl. | | | | |

As aforementioned, it is noteworthy that the anamorphosing lens system is designed as a companion of the objective 11 since their individual image aberrations are carefully matched to each other and other objectives cannot be substituted in the combination unless the other objectives substantially duplicate the original one.

It will be seen from the foregoing that the disclosed combination of lens elements and systems is particularly advantageous in accomplishing the objects of this invention since the color aberrations may be substantially eliminated when the color-correcting lens member is designed solely for that purpose. The treatment of color aberrations in the anamorphosing group 10, for example, is thereby so greatly simplified that it permits more latitude in the correction of the monochromatic image aberrations.

Although only one form of this invention is shown and described in detail, other embodiments are possible and changes may be made in the number and arrangement of the component elements and substitutions may be made therein without departing from the spirit of the invention as defined in the appended claims.

I claim:

1. A wide angle afocal anamorphosing lens system for use in conjunction with a cinematographic objective comprising the combination of front negative and rear positive cylindrical lenses which are jointly corrected for substantially all of the monochromatic image aberrations, the rear lens being constructed from a double convex cylindrical rear element which is cemented to a double concave cylindrical front element having a higher refractive index than said rear element and the focal length of the rear positive lens being about twice the focal length of the front negative lens, the cylindrical axes of said positive and negative lenses being aligned in a single vertical plane, and unitary means spaced forwardly of and in optical alignment with said front negative lens for reducing the chromatic aberration of said system comprising a pair of plano-concave cylindrical lens elements joined to the opposite faces of an interposed biconvex cylindrical element, the plano surfaces of the concave elements being exterior and parallel and the refractive index being substantially the same for each of the elements of said means so that light rays traversing said means are substantially undeviated, the plano-concave elements being formed from materials having $\nu$ values which differ by at least 10 from the $\nu$ value of the material of the interposed element.

2. In combination with a conventional cinematographic objective, an afocal anamorphosing lens system for changing the horizontal magnification of an image formed by the objective, said system comprising a compound front cylindrical lens having relatively large dispersive power and substantially no refractive power, said member being formed of three cemented elements which act solely to correct the chromatism in said image, a positive cylindrical lens formed of two cemented elements spaced rearwardly from the front lens, and a negative cylindrical lens located between the first two-named lenses, the individual cylindrical axes of each of the lenses and elements lying substantially in a common vertical plane which is coincident with the optical axis of said objective, said negative and positive lenses being jointly corrected to substantially eliminate the monochromatic image aberrations of astigmatism, coma, spherical aberration and distortion in a horizontal plane in agreement with the corresponding image aberrations in the objective, the constructional data relating to said system being given within specified limits herebelow wherein F represents the effective focal length of said objective, $R_1$, $R_2$, $R_3$, $R_4$, $R_5$, $R_6$, $R_7$, $R_8$, $R_9$ represent the radii of curvature of the cylindrical surfaces of the elements, $S_1$, $S_2$, $S_3$ represent the axial spaces between the lenses, $T_1$, $T_2$, $T_3$, $T_4$, $T_5$, $T_6$ represent axial thicknesses of the elements, $n_D$ represent the refractive index of the material of the lens elements, and $\nu$ represents the Abbe number of said material, the various symbols being arranged in their order of occurrence starting from the front,

| | | |
|---|---|---|
| $R_1 = \infty$ | | |
| $T_1 = .10$ F to .13 F | $\begin{matrix} n_D = 1.617 \\ \nu = 54.9 \end{matrix}$ Element A | |
| $R_2 = -1.3$ F to $-2.65$ F | | |
| $T_2 = .23$ F to .86 F | $\begin{matrix} n_D = 1.617 \\ \nu = 36.6 \end{matrix}$ Element B | Lens 19 |
| $R_3 = 1.3$ F to 3.14 F | | |
| $T_3 = .07$ F to .13 F | $\begin{matrix} n_D = 1.617 \\ \nu = 54.9 \end{matrix}$ Element C | |
| $R_4 = \infty$ | | |
| $S_1 = .01$ F to .4 F | | |
| $R_5 = -1.9$ F to $-3.25$ F | | |
| $T_4 = .12$ F to .21 F | $\begin{matrix} n_D = 1.617 \\ \nu = 54.9 \end{matrix}$ Lens D | |
| $R_6 = -.5$ F to $-1.0$ F | | |
| $S_2 = 1.2$ F to 2.02 F | | |
| $R_7 = 2.5$ F to 4.19 F | | |
| $T_5 = .08$ F to .14 F | $\begin{matrix} n_D = 1.617 \\ \nu = 36.6 \end{matrix}$ Element E | |
| $R_8 = -1.8$ F to $-3.2$ F | | Lens 15 |
| $T_6 = .14$ F to .24 F | $\begin{matrix} n_D = 1.541 \\ \nu = 59.9 \end{matrix}$ Element F | |
| $R_9 = .8$ F to 1.47 F | | |
| $S_3 = .03$ F to .15 F | | |

(References on following page)

References Cited in the file of this patent

UNITED STATES PATENTS

| | | |
|---|---|---|
| 435,271 | Abbe et al. | Aug. 26, 1890 |
| 1,556,982 | Weidert | Oct. 13, 1925 |
| 1,863,099 | Bowen | June 14, 1932 |
| 1,873,302 | De Francisco | Aug. 23, 1932 |
| 1,932,082 | Newcomer | Oct. 24, 1933 |
| 1,934,561 | Rayton | Nov. 7, 1933 |
| 1,962,892 | Chretien | June 12, 1934 |
| 2,017,634 | Newcomer | Oct. 15, 1935 |
| 2,317,790 | Mellor | Apr. 27, 1943 |
| 2,596,799 | Tillyer et al. | May 13, 1952 |
| 2,702,493 | Knowlton | Feb. 22, 1955 |
| 2,720,813 | Cox | Oct. 18, 1955 |

FOREIGN PATENTS

| | | |
|---|---|---|
| 1,082,780 | France | June 23, 1954 |

OTHER REFERENCES

Hawkins et al.: "An Improved Type of Schmidt Camera," Nature, vol. 157, No. 3988, 1946, pages 445 and 446.